(12) United States Patent
Wang et al.

(10) Patent No.: US 7,664,328 B2
(45) Date of Patent: Feb. 16, 2010

(54) JOINT CLASSIFICATION AND SUBTYPE DISCOVERY IN TUMOR DIAGNOSIS BY GENE EXPRESSION PROFILING

(75) Inventors: Lu-yong Wang, Plainsboro, NJ (US); Zhuowen Tu, San Diego, CA (US); Daniel Fasulo, Titusville, NJ (US); Dorin Comaniciu, Princeton Junction, NJ (US)

(73) Assignee: Siemens Corporation, Iselin, NJ (US)

( * ) Notice: Subject to any disclaimer, the term of this patent is extended or adjusted under 35 U.S.C. 154(b) by 644 days.

(21) Appl. No.: 11/424,135

(22) Filed: Jun. 14, 2006

(65) Prior Publication Data

US 2007/0133857 A1 Jun. 14, 2007

Related U.S. Application Data

(60) Provisional application No. 60/693,546, filed on Jun. 24, 2005.

(51) Int. Cl.
G06K 9/62 (2006.01)

(52) U.S. Cl. .................. 382/224; 382/133; 382/156; 382/159; 702/20; 706/19; 706/20; 706/45

(58) Field of Classification Search .............. 382/133, 382/159, 224; 702/19, 20; 706/19, 20, 45
See application file for complete search history.

(56) References Cited

U.S. PATENT DOCUMENTS

| | | | |
|---|---|---|---|
| 7,117,188 B2 * | 10/2006 | Guyon et al. ............... 706/20 |
| 7,370,021 B2 * | 5/2008 | Reeve et al. ............... 706/16 |
| 7,428,554 B1 * | 9/2008 | Coberley et al. ......... 707/104.1 |
| 7,593,913 B2 * | 9/2009 | Wang et al. ................ 706/62 |
| 2003/0172043 A1 * | 9/2003 | Guyon et al. .............. 706/48 |
| 2003/0225526 A1 * | 12/2003 | Golub et al. ............... 702/19 |
| 2003/0233197 A1 * | 12/2003 | Padilla et al. .............. 702/20 |
| 2004/0236723 A1 * | 11/2004 | Reymond .................. 707/2 |
| 2005/0069863 A1 * | 3/2005 | Moraleda et al. ........... 435/4 |
| 2006/0074834 A1 * | 4/2006 | Dong et al. ................ 706/45 |
| 2007/0071313 A1 * | 3/2007 | Zhou et al. ............... 382/155 |
| 2008/0027917 A1 * | 1/2008 | Mukherjee et al. ......... 707/3 |

OTHER PUBLICATIONS

Freund, Y. and Schapire, RE (1999) "A Short Introduction to Boosting," Journal of Japanese Society for Artificial Intelligence, 14(5), 771-780.

(Continued)

Primary Examiner—Gregory M Desire

(57) ABSTRACT

A program storage device is provided readable by machine, tangibly embodying a program of instructions executable by the machine to perform method steps for classification of biological tissue by gene expression profiling. The method steps include providing a training set of gene expression profiles of known tissue samples, providing a first-layer strong classifier of the known tissue samples by combining weak classifiers using boosting, creating two sample sets based on the first classifier, populating the two sample sets with a next-layer of classifiers based on a previous-layer classifier, organizing the classifiers in a tree data structure, and outputting the tree data structure as a probabilistic boosting tree classifier for tissue sample classification and disease subtype discovery. A multi-class diagnosis problem is transformed to a two-class diagnosis process by finding an optimal feature and dividing the multi-class problem into two-classes.

19 Claims, 5 Drawing Sheets

Input Training Expression Profiles:
$S = \{(x_1, y_1, w_i), ..., (x_n, y_n, w_i)\}$, where $x_i \in X, y_i \in Y : \{-1, +1\}$
Initialize $D_1(i) = \frac{w_i}{\sum w_i}$
For each $t = 1, ..., T$ (1) Train the base learner using distribution $D_t$ (2) Get Weak hypothesis $h_t : X \rightarrow \{-1, +1\}$ with error
$\epsilon_t = Pr_{i \sim W_t}[h_t(x_i) \neq y_i]$ (3) Choose $\alpha_t = \frac{1}{2} ln(\frac{1-\epsilon_t}{\epsilon_t})$ (4) Update:

$$D_{t+1}(i) = \frac{D_t(i) e^{(-\alpha_t y_i h_t(x_i))}}{Z_t} \quad (1)$$

where $Z_t$ is a nomalization factor

Output: Final hypothesis $$H(x) = \sum_{t=1}^{T} \alpha_t h_t(x) \quad (2)$$

OTHER PUBLICATIONS

Shapiro, RE (2002) "The Boosting Approach to Machine Learning an overview" MSRI Workshop on Nonlinear Estimation and Classification, Lecture Notes in Computer Science, Spring-Verlag.

Viola, P. et al., (2001) "Rapid Object Detection Using A Boosted Cascade of Simple Features," IEEE Computer Society Conference on Computer Vision and Pattern Recognition (Cvpr) 1,511-518.

Alexandridis, R., Lin, S. and Irwin, M. (2004) "Class Discovery and Classification of Tumor Samples Using Mixture Modelling of Gene Expression Data," Bioinformatics, Advanced Access, 20:16 2545-2552.

Alon, U. et al., (1999) "Broad Patterns of Gene Expression Revealed by Clustering Analysis of Tumor and Normal Colon Tissues Probed by Oligonucleotide Arrays," Proc Natl. Acad. Sci USA 96,6745-6750.

Ben-Dor. A. et al., (2000) "Tissue Classification With Gene Expression Profiles," Journal of Computational Biology, 7 559-584.

Brown et al. (2000) "Knowledge-Based Analysis of Microarray Gene Expression Data by Using Support Vector Machines," Proceeding of National Academy of Science 97:262-267.

Deftling, M. et al, (2003) "Boosting for Tumor Classification With Gene Expression Data," Bioinformatics 19:9 1061-1069.

Dudoit, S. et al., (2000) "Comparison of Discrimination Methods for the Classification of Tumors Using Gene Expression Data," Technical Report 576, Department of Statistics, University of California, Berkely.

Friedman, N. et al. (2000) "Using Bayesian Network to Analyze Expression Data," Journal of Computational Biology 7:601-620.

Furey, T. S. et al., (2000) "Support Vector Machine Classification and Validation of Cancer Tissue Samples Using Microarray Expression Data," Bioinformatics 16:10 906-914.

Golub, T. R. et al., (2002) "Molecular Classification of Cancer: Class Discovery and Class Prediction by Gene Expression Monitoring," Science 286:531-537.

Liu, Y. et al. (2004) "Multiclass Discovery in Array Data," Bmcbioinformatics, 5 70.

Nguyen, D. et al. (2002) "Tumor Classification by Partial Least Squares Using Microarray Gene Expression Data," Bioinformatics, 18:1 39-50.

Ramaswany, S. et al. (2001) "Multiclass Cancer Diagnosis Using Tumor Gene Expression Signatures," Proc Natl. Acad. Sci. USA, 98 15149-15154.

Varma S., et al. "Iterative Class Discovery and Feature Selection Using Minimal Spanning Trees," Bmc Bioinformatics, 5 126.

* cited by examiner

100 — Input Training Expression Profiles:
$S = \{(x_1, y_1, w_i), ..., (x_n, y_n, w_i)\}$, where $x_i \in X, y_i \in Y : \{-1, +1\}$
Initialize $D_1(i) = \frac{w_i}{\sum w_i}$
For each $t = 1, ..., T$ 101 — (1) Train the base learner using distribution $D_t$ 102 — (2) Get Weak hypothesis $h_t : X \to \{-1, +1\}$ with error
$\epsilon_t = Pr_{i \sim W_t}[h_t(x_i) \neq y_i]$ 103 — (3) Choose $\alpha_t = \frac{1}{2} ln(\frac{1-\epsilon_t}{\epsilon_t})$ 104 — (4) Update:
$$D_{t+1}(i) = \frac{D_t(i)e^{(-\alpha_t y_i h_t(x_i))}}{Z_t} \quad (1)$$
where $Z_t$ is a nomalization factor 105 — Output: Final hypothesis
$$H(x) = \sum_{t=1}^{T} \alpha_t h_t(x) \quad (2)$$

FIG. 1

| | |
|---|---|
| 200 | Input: Samples for training: $S = \{(x_1, y_1, w_1), ..., (x_n, y_n, w_n)\}$, where $x_i \in X, y_i \in Y : \{-1, +1\}, \sum_i w_i = 1$; |
| 201 | (1) Compute the empirical distribution $\hat{q}(y) = \sum_i w_i \delta(y_i = y)$ |
| 202 | (2) For training set S, train a strong classifier using AdaBoost algorithm with T weak classifiers |
| 203 | (3) If $\epsilon_t < \theta$ ($\theta$ is a predifined error rate threshold), exit from the iteration |
| 204 | (4) If current tree depth is L, then exit |
| 205 | (5) Initialize two empty set $S_{left}$ and $S_{right}$ |
| 206 | (6) For each sample $(x_i, y_i)$, compute the probability $q(+1\|x)$ and $q(+1\|x)$ using the learned strong classifier. If $q(+1\|x) - \frac{1}{2} < \varepsilon$, Then $(x_i, y_i, 1) \to S_{right}$ else if $q(-1\|x) - \frac{1}{2} < \varepsilon$, en $(x_i, y_i, 1) \to S_{left}$ else $(x_i, y_i, q(+1\|x_i)) \to S_{right}$; $(x_i, y_i, q(-1\|x_i)) \to S_{left}$ |
| 207 | (7) Normalized all the weights of the samples in the $S_{left}$ |
| 208 | (8) Repeat the procedure |
| 209 | (9) Normalized all the weights of the samples in the $S_{right}$ |
| 210 | (10) Repeat the procedure |

FIG. 2

Function $F_N(x,y)$ to compute posterior distribution $\hat{p}(y|x)$ at tree node N 1. For a given sample x, calculate $q_N(+1|x)$ and $q_N(-1|x)$ using the learned AdaBoost model at the current tree node N 2. If $q_N(+1|x) - \frac{1}{2} > \varepsilon$, then $\hat{p}_{right}(y) = F_{right(N)}(x,y)$ and $\hat{p}_{left}(y) = \hat{q}_{left(N)}(y)$ where $\hat{q}_{left(N)}(y)$ is the empirical distribution of the left tree.

else if $q_N(+1|x) - \frac{1}{2} > \varepsilon$, then $\hat{p}_{right}(y) = \hat{q}_{right(N)}(y)$ and $\hat{p}_{left}(y) = F_{left(N)}(x,y)$ else $\hat{p}_{right}(y) = F_{right(N)}(x,y)$ and $\hat{p}_{left}(y) = F_{left(N)}(x,y)$ 3. $\hat{p}_N(y|x) = q(+1|x)\hat{p}_{right}(y) + q(-1|x)\hat{p}_{left}(y)$

FIG. 3

400 — Given: Samples for training: $S = \{(x_1,y_1,w_1),...,(x_n,y_n,w_n)\}$, where $x_i \in X, y_i \in Y : \{-1,+1\}$, $\sum_i w_i = 1$; where $x_i \in X, y_i \in Y : \{-1,+1\}$, $\sum_i w_i = 1$;

401 — 1. Compute the empirical distribution $\hat{q}(y) = \sum_i w_i \delta(y_i = y)$ 402 — 2. For each feature $H_j$ at value $v_j$, calculate the histogram $hist_{left}(k) = \frac{1}{Z_{left}} \sum_i \delta(k=y_i) w_i$ for $y_i < v_j$ and $hist_{right}(k) = \frac{1}{Z_{right}} \sum_i \delta(k=y_i) w_i$ for $y_i \geq v_j$ 403 — 3. Find the optimal $H_j$ and $v_j$ that reach the minimal entropy $Z_{left} Entrophy(hist_{left}) + Z_{right} Entrophy(hist_{right})$.

404 — 4. Create a new set $S' = \{(x_1,y'_1,w_1),...,(x_n,y'_n,w_n)\}$, where where $x_i \in X, y'_i \in Y : \{-1,+1\}$,
$y'_i = +1$ if $Z_{left} Entrophy(hist_{left}) < Z_{right} Entrophy(hist_{right})$
$y'_i = -1$ otherwise 405 — 5. Follow the same procedure in 2-class probabilistic tree, as now it becomes a 2-class problem in (6)

406 — 6. Repeat the procedure above

FIG. 4

JOINT CLASSIFICATION AND SUBTYPE DISCOVERY IN TUMOR DIAGNOSIS BY GENE EXPRESSION PROFILING

This application claims the benefit of Provisional Application No. 60/693,546 filed on Jun. 24, 2005 in the United States Patent and Trademark Office, the contents of which are herein incorporated by reference in its entirety.

BACKGROUND OF THE INVENTION

1. Field of the Invention

The present disclosure relates to bioinformatics, and more particularly to a system and method for joint classification and subtype discovery in tumor diagnosis by is gene expression profiling.

2. Description of Related Art

The accurate determination of tumor's site of origin and pathogenesis is important for the cancer diagnosis and treatment. In general, pathologists utilize a variety of histological, genetic and immunologic techniques to make site-specific diagnosis. However, current techniques are limited in their probability to distinguish different tumor types. Many specimens are incorrectly classified due to their morphological similarity to other tumor types. Also, a large number of samples remain poorly differentiated and difficult to related to any known tumor type. Moreover, many heterogeneous diseases consists of various potential subtypes in molecular basis and differ remarkably in their response to therapies.

The optimal treatment of patients with complex diseases, such as cancers, depends on the accurate diagnosis by using a combination of clinical and histo-pathological data. In many scenarios, it becomes tremendously difficult because of the limitations in clinical presentation and histo-pathology. To accurate diagnose complex diseases, the molecular classification based on gene/protein expression profiles are needed. Moreover, many heterogeneous diseases are comprised of various potential subtypes in molecular basis and differ in their response to therapies. Thus, an accurate prediction of subgroups on disease gene expression profiles is needed.

Therefore, a need exists for a system and method incorporating knowledge of the molecular basis and classification of disease in the prediction of patient outcome, the informed selection of therapies, identification of novel molecular targets for therapy, etc.

SUMMARY OF THE INVENTION

According to an embodiment of the present disclosure, a program storage device is provided readable by machine, tangibly embodying a program of instructions executable by the machine to perform method steps for classification of biological tissue by gene expression profiling For a two-class diagnostic problem, the method steps include providing a training set of gene expression profiles of known tissue samples, and constructing a probabilistic boosting tree classifier using a learning framework. The framework for learning models for discriminating between two-classes, the models automatically being assembled as the probabilistic boosting tree classifier comprising a plurality of nodes, in which each node is a strong classifier combined from a plurality of weak classifiers based on boosting. The probabilistic boosting tree classifier is outputted for tissue sample classification.

Outputting the probabilistic boosting tree classifier comprises storing the probabilistic boosting tree classifier on a computer-readable media.

The method includes applying the probabilistic boosting tree classifier to a gene expression profile of a tissue of interest and outputting a classification of the tissue of interest.

Outputting the classification comprises one of displaying the classification and storing the classification in a computer-readable media.

Outputting the classification comprises outputting a disease subtype discovered automatically.

The probabilistic boosting tree classifier is a probabilistic tree, and the method further includes determining an overall approximated posterior distribution of gene expression profiles of tissue samples of interest, and outputting a classification of the tissue sample of interest.

According to an embodiment of the present disclosure, a program storage device is provided readable by machine, tangibly embodying a program of instructions executable by the machine to perform method steps for multi-way classification of biological tissue by gene expression profiling. For a multi-class diagnosis problem, the method includes providing a training set of expression profiles of known tissue samples, determining an empirical distribution of the training set, and determining a plurality of histograms of the training set for a plurality of features. The method further includes determining a feature among the plurality of features that reaches a minimum of entropy of the histograms and dividing the multi-class diagnosis problem into two-classes, and determining a probabilistic boosting tree classifier according to a two-class probabilistic tree procedure applied to the training set, wherein the probabilistic boosting tree classifier is stored on a computer-readable media.

The expression profile is one of a gene expression profile or a protein expression profile.

The method includes applying the probabilistic boosting tree classifier against a gene expression profile of a tissue of interest, and outputting a classification of the tissue of interest.

Outputting the classification comprises one of displaying the classification and storing the classification in a computer-readable media.

Outputting the classification comprises discovering and outputting a disease subtype of the tissue of interest.

The probabilistic boosting tree classifier is applied to determine an overall approximated posterior distribution of a gene expression profile of a tissue of interest, the method further comprising outputting a classification of the tissue of interest.

BRIEF DESCRIPTION OF THE DRAWINGS

Preferred embodiments of the present invention will be described below in more detail, with reference to the accompanying drawings:

FIG. 1 illustrates an adaptive boosting method, according to an embodiment of the present disclosure;

FIG. 2 illustrates a 2-class probabilistic boosting tree training method, according to an embodiment of the present disclosure;

FIG. 3 illustrates a 2-class probabilistic boosting tree testing method, according to an embodiment of the present disclosure;

FIG. 4 illustrates a multi-class probabilistic boosting tree training method, according to an embodiment of the present disclosure.

DETAILED DESCRIPTION OF PREFERRED EMBODIMENTS

Figure 5:
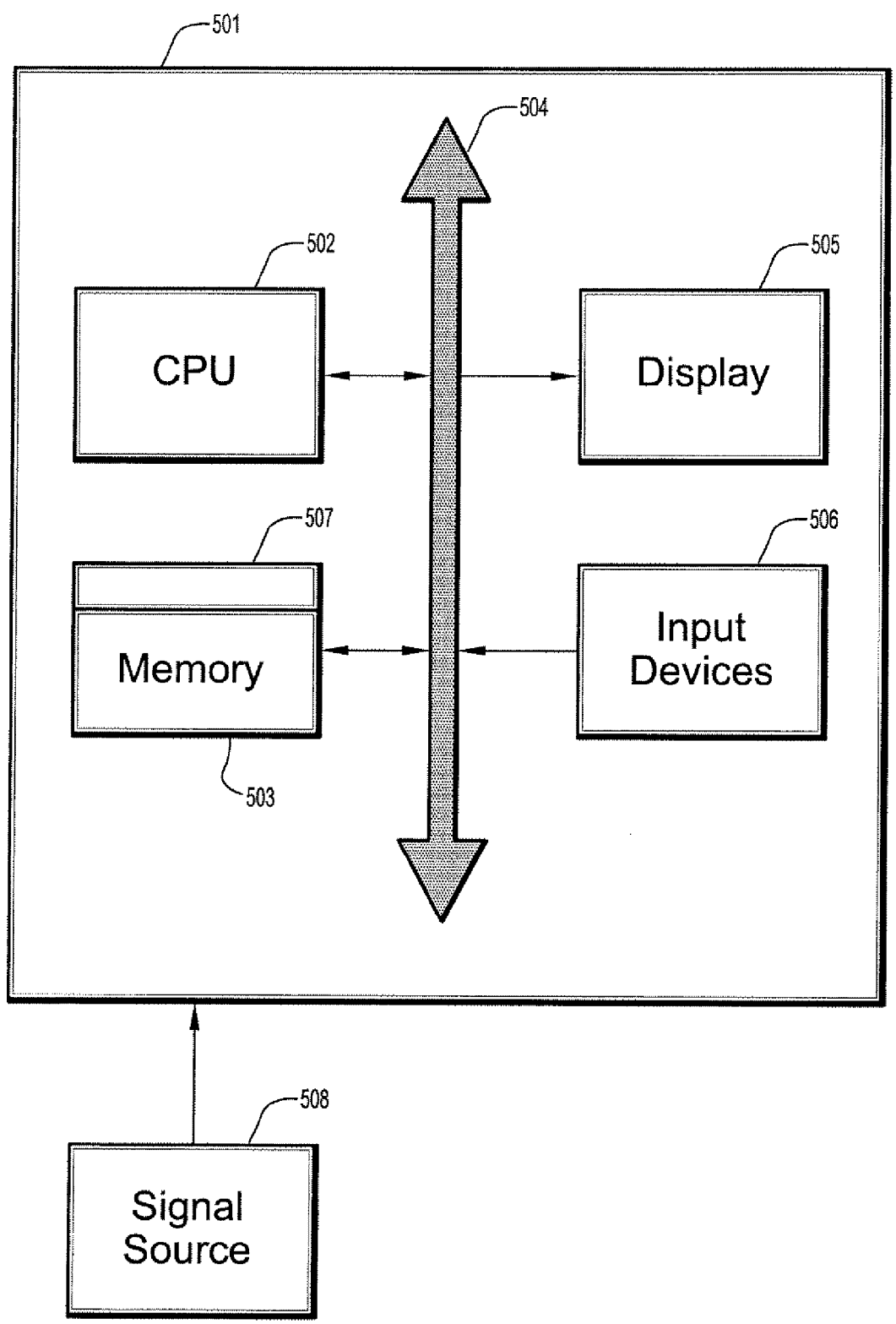
FIG. 5 is a diagram of a system according to an embodiment of the present disclosure.

According to an embodiment of the present disclosure, a system and method jointly classify disease type and detect a disease subtype based on gene expression profiles. The system and method implement a probabilistic Boosting-Tree method on gene expression profiles of tumors for disease classification and subtype discovery in diseases. A tree in which each node combines a number of weak classifiers into a strong classifier is automatically constructed (a conditional posterior probability). Subtype discovery is embedded in the learning process.

According to an embodiment of the present disclosure, a joint classification and subtype discovery method in tumor classification is based on gene expression profiles of the disease and control tissue samples. The system and method is based on a probabilistic boosting tree, which is capable of learning discriminative models for both classification and class discovery. The system and method not only classifies diseases from normal controls, but also detects subclasses within the tumor samples based on their discriminative features.

According to an embodiment of the present disclosure, a system and method for joint classification and subtype discover may be integrating into both classification and clustering methods. A clustering process is built upon discriminative features. The system and method are capable of multi-class classification. A boosting method improves prediction accuracy of the system and method. A probabilistic boosting tree procedure improves the detection performance and decreases the computation time. The system and method are scalable for large datasets and robust to training error.

According to an embodiment of the present disclosure, a system and method implements multi-classification and subtype discovery on human carcinomas by gene expression profiling.

Lung carcinomas are classified as small-cell lung carcinomas (SCLC) or non-small-cell lung carcinomas (NSCLC) by microscopic morphology and immunohistochemistry. NSCLC is further classified as adenocarcinomas, squamous cell carcinomas, and large cell carcinomas. Adenocarcinomas are the most common one. Knowledge of the molecular basis and classification of lung carcinomas aids in the prediction of patient outcome, the informed selection of novel molecular target for chemotherapy.

An experimental dataset used for evaluating systems and methods included a total of 186 lung tumors and 17 normal lung specimens were used to create two datasets of gene expression profiles. In dataset A, 127 cases are adenocarcinomas, 21 cases are squamous cell lung carcinomas, 20 case are pulmonary carcinoids, 6 cases are SCLC, and 17 normal lung samples. There are 12 adenocarcinomas were suspected to be extrapulmonary metastases based on clinical history. Dataset B only include adenocarcinomas and normal lung samples.

According to an embodiment of the present disclosure, probabilistic boosting tree-based classification and subtype discovery is based on a learning framework, called a Probabilistic Boosting Tree (PBTree), which utilized AdaBoost as a basic unit for the learning process.

For self-consistency, a general AdaBoost method is described here with reference to FIG. 1. Boosting is a method for improving the accuracy of any given learning method. AdaBoost takes $(x_1, y_1, w_1), \ldots, (x_n, y_n, w_n)$ as input, where each $x_i$ belongs to some instance space, such as gene expression profiles, $y_i$ belongs to label set $Y\{+1,-1\}$ (disease or control), and $w_i$ is the weights of the samples, which may be set equal to 1 for the initialization 100. AdaBoost calls a given base learning method repeated in t rounds. $D_1(i)$ represents the weight of the distribution on training sample i on round t (e.g., a set of weights over the training samples) 101. At each iteration t, the base learner is utilized to find a weak hypothesis $h_t:X \to \{-1,+1\}$ appropriate for the distribution 102. The weights are updated 104, wherein the weights of incorrectly classified examples are increased so that the base learner is forced on hard examples in a training set 103. The base learner is called again with new weights over the training examples and the process iterates. Thus, all the weak hypotheses being combined into a single strong hypothesis using a weighted majority vote 105.

The discriminative model corresponding to the string classifier, H(x) (see 105), is $$q(y|x) = \frac{e^{2yH(x)}}{1+e^{2yH(x)}}$$

The error rate $\epsilon$ (see 102) is bounded by $\epsilon \leq 2^T \Pi_{t=1}^T \sqrt{\epsilon_t(1-\epsilon_t)}$.

One feature of AdaBoost is that misclassified samples in the previous training received more weights in the next iteration (see 103). However, AdaBoost cannot rule out the chance that the correctly classified samples be miss-classified again. Thus, a probabilistic boosting tree (PBTree) method is utilized in a divide-and-conquer approach in the training.

To illustrate a PBTree in a simple format, the probabilities determined by each learned AdaBoost method are denoted as:

$$q(+1|x) = \frac{e^{2H(x)}}{1+e},$$

$$q(-1|x) = \frac{e^{-2H(x)}}{1+e^{-2H(x)}}$$

FIG. 2 shows a 2-class PBTree training method. Given the training set 200, an empirical distribution of the training set, a training set of a gene expression profile of a tissue of interest, is determined 201. At each node, a strong classifier is learned using the AdaBoost method 202. At block 203, if the error rate $\epsilon$ for a current round is less than a predefined error rate, then the method is terminated 203. Further, if a current tree depth is L, a maximum depth of the tree, the method terminates 204. Assuming that the method is not terminated, two empty sets, a left set and a right set, are initialized 205 and the training samples are divided into these two sets using the learned strong classifier 206. A left sub-tree and a right sub-tree are trained (207-208 and 209-210 respectively). To control an overfitting problem, variable $\epsilon$ is defined to identify support vectors. Support vectors are samples falling in the range of $[1/2-\epsilon, 1/2+\epsilon]$ and are treated as confusing samples, which are used in the left and right sub-trees for learning.

In a similar way, the testing process for probabilistic boosting tree is performed in a top-down fashion. As FIG. 3 illustrates, a testing process begins from a top node. It gathers the information from its descendant and reports an overall approximated posterior distribution. The method can also turn into a classifier that makes hard decision. As q(+1|x) and q(−1|x) are determined 301, it can be decided to go into the right or left sub-trees by comparing these two probabilities 302. The prediction of a label y is made at the leaf node of the tree by checking the empirical distributions 303. Prediction results are then passed back to the top node of the tree.

AdaBoost for multi-class classification uses a multi-class weak classifier, which is more computational expensive to learn and determine than 2-class weak classifier. When the number of classes becomes large, this becomes a problem. FIG. 4 shows a method for training a multi-class probabilistic boosting tree.

Referring to FIG. 4, given the training set 400 of the gene expression profile, the empirical distribution of the training set is determined, e.g., as $$\hat{q}(y) = \sum_i w_i \delta(y_i = y)$$

401. For each weak classifier or feature $H_j$ at value $v_j$, a histogram $$hist_{left}(k) = \frac{1}{Z_{left}} \sum_i \delta(k = y_i) w_i$$

for $y_i < v_i$ and $$hist_{right}(k) = \frac{1}{Z_{right}} \sum_i \delta(k = y_i) w_i$$

for $y_i \geq v_i$ is determined 402. The optimal classifier $H_j$ and value $v_j$ that reach the minimum entropy $Z_{left}$Entropy$(hist_{left}) + Z_{right}$Entropy$(hist_{right})$ is determined 403. A new set $S' = \{(x_1, y_1', w_1), \ldots, (x_n, y_n', w_n)\}$, where $x_i \in X, y_1' \in Y$: $\{-1,+1\} y_1' = +1$ if $Z_{left}$Entropy$(hist_{left}) < Z_{right}$Entropy$(hist_{right})$, $y_1' = -1$ otherwise, is created 404. Given the new set, the 2-class probabilistic tree procedure may be used 405. The method may be iterated 406.

The method finds optimal features that divide the multi-class patterns into 2 classes. A 2-class probabilistic boosting tree is utilized to learn the classifier. The testing procedure is similar to the 2-class probabilistic boosting tree testing procedure. The 2-class classification problem is a special case of the multi-class problem. The scale of the problem is O(log (n)), where n is the number of classes.

According to an embodiment of the present disclosure, a method for gene expression profiling implements joint classification and subtype discovery on expression profiles. The subtype discovery is based on discriminative features. The method is capable of dealing both multi-class and two-class classification problem. The method provides a valid tool for doctors to make diagnosis and enable doctors detect new subtype during the diagnostic process. The method is capable of extending to new domain data, such as clinical data. Thus, it is capable of providing a useful tool in the personalized medicine. In scalability, the method outperforms Boosted Cascade, which can deal with large dataset for one of the classes. The method is scalable for large training database, and can be utilized in database-guided diagnosis.

Referring now to FIGS. 1-4; a method for classification of biological tissue by gene expression profiling includes providing a training set of gene expression profiles of known tissue samples (200), providing a first-layer strong classifier of the known tissue samples by combining weak classifiers using boosting (100-105), creating samples sets (left/right) based on the first classifier (205-206), creating a next-layer of classifiers of the created left and right sample sets based on the previous-layer classifier, organizing the classifiers in a tree data structure and the procedure is repeated (207-210), and outputting the tree structure as a probabilistic boosting tree classifier for tissue sample classification (301-303) and disease subtype discovery (206). A multi-class diagnosis problem is transformed to two-class diagnosis process by finding optimal feature and dividing the multi-class problem into two-classes (402-404).

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Referring to FIG. 5, according to an embodiment of the present disclosure, a computer system 501 for gene expression profiling can comprise, inter alia, a central processing unit (CPU) 502, a memory 503 and an input/output (I/O) interface 504. The computer system 501 is generally coupled through the I/O interface 504 to a display 505 and various input devices 506 such as a mouse and keyboard. The support circuits can include circuits such as cache, power supplies, clock circuits, and a communications bus. The memory 503 can include random access memory (RAM), read only memory (ROM), disk drive, tape drive, etc., or a combination thereof. The present invention can be implemented as a routine 1007 that is stored in memory 503 and executed by the CPU 502 to process the signal from the signal source 508. As such, the computer system 501 is a general-purpose computer system that becomes a specific purpose computer system when executing the routine 507 of the present invention.

The computer platform 501 also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present disclosure provided herein, one of ordinary skill in the related art will be able to contemplate these and similar implementations or configurations.

Having described embodiments for a system and method for gene expression profiling, it is noted that modifications and variations can be made by persons skilled in the art in light of the above teachings. It is therefore to be understood that changes may be made in embodiments of the present disclosure that are within the scope and spirit thereof.

What is claimed is:

1. A computer readable medium embodying a program of instructions executable by a processor to perform method steps for classification of biological tissue by gene expression profiling, the method steps comprising:

providing a training set of gene expression profiles of known tissue samples;

constructing a probabilistic boosting tree classifier using a learning framework, the framework for learning models for discriminating between two-classes, the models automatically being assembled as the probabilistic boosting tree classifier comprising a plurality of nodes, in which each node is a strong classifier combined from a plurality of weak classifiers based on boosting; and outputting the probabilistic boosting tree classifier for tissue sample classification.

2. The computer readable medium of claim 1, wherein outputting the probabilistic boosting tree classifier comprises storing the probabilistic boosting tree classifier on a computer-readable media.

3. The computer readable medium of claim 1, further comprising:

applying the probabilistic boosting tree classifier to a gene expression profile of a tissue of interest; and outputting a classification of the tissue of interest.

4. The computer readable medium of claim 3, wherein outputting the classification comprises one of displaying the classification and storing the classification in a computer-readable media.

5. The computer readable medium of claim 3, wherein outputting the classification comprises outputting disease subtypes discovered automatically.

6. The computer readable medium of claim 1, further comprising:

determining an overall approximated posterior distribution of a gene expression profile of a tissue sample of interest; and outputting a classification of the tissue sample of interest.

7. The computer readable medium of claim 1, wherein the training set is one of a gene expression profile and a protein expression profile.

8. A computer readable medium embodying a program of instructions executable by a processor to perform method steps for a multi-way classification of biological tissue by gene expression profiling for a multi-class diagnosis problem, the method steps comprising:

providing a training set of expression profiles of known tissue samples; and determining an empirical distribution of the training set;

determining a plurality of histograms of the training set for a plurality of features;

determining a feature of the plurality of features that reaches a minimum of entropy of the histograms and dividing the multi-class diagnosis problem into two-classes; and determining a probabilistic boosting tree classifier according to a two-class probabilistic tree procedure applied to the training set, wherein the probabilistic boosting tree classifier is stored on a computer-readable media.

9. The computer readable medium of claim 8, wherein the training set is one of a gene expression profile and a protein expression profile.

10. The computer readable medium of claim 8, further comprising:

applying the probabilistic boosting tree classifier against a gene expression profile of a tissue of interest; and outputting a classification of the tissue of interest.

11. The computer readable medium of claim 10, wherein outputting the classification comprises one of displaying the classification and storing the classification in a computer-readable media.

12. The computer readable medium of claim 10, wherein outputting the classification comprises outputting a disease subtype of the tissue of interest.

13. The computer readable medium of claim 8, wherein the probabilistic boosting tree classifier is applied to determine an overall approximated posterior distribution of a gene expression profile of a tissue of interest, the method further comprising outputting a classification of the tissue of interest.

14. A computer-implemented method for classification of biological tissue by gene expression profiling comprising:

a computer to implement the steps of:

providing a training set of gene expression profiles of known tissue samples;

learning a first-layer strong classifier of the known tissue samples by combining weak classifiers by boosting; creating two sample sets based on the first-layer classifier;

populating the two sample sets by creating a next layer of classifiers based on a previous layer classifier;

organizing the classifiers in a tree data structure; and outputting the tree data structure as a probabilistic boosting tree classifier for tissue classification and disease subtype discovery.

15. The computer-implemented method of claim 14, wherein outputting the probabilistic boosting tree classifier comprises storing the probabilistic boosting tree classifier on a computer-readable media.

16. The computer-implemented method of claim 14, further comprising:

applying the probabilistic boosting tree classifier against a gene expression profile of a tissue of interest; and outputting a classification of the tissue of interest.

17. The computer-implemented method of claim 16, wherein outputting the classification comprises one of displaying the classification and storing the classification in a computer-readable media.

18. The computer-implemented method of claim 16, wherein outputting the classification comprises outputting a disease subtype.

19. The computer-implemented method of claim 14, the method further comprising:

determining an overall approximated posterior distribution of a gene expression profile of a tissue of interest; and outputting a classification of the tissue of interest.

* * * * *